Dec. 10, 1963
E. B. WILLIAMS, JR
3,113,630
DRILL BIT
Filed Nov. 8, 1960
2 Sheets-Sheet 1
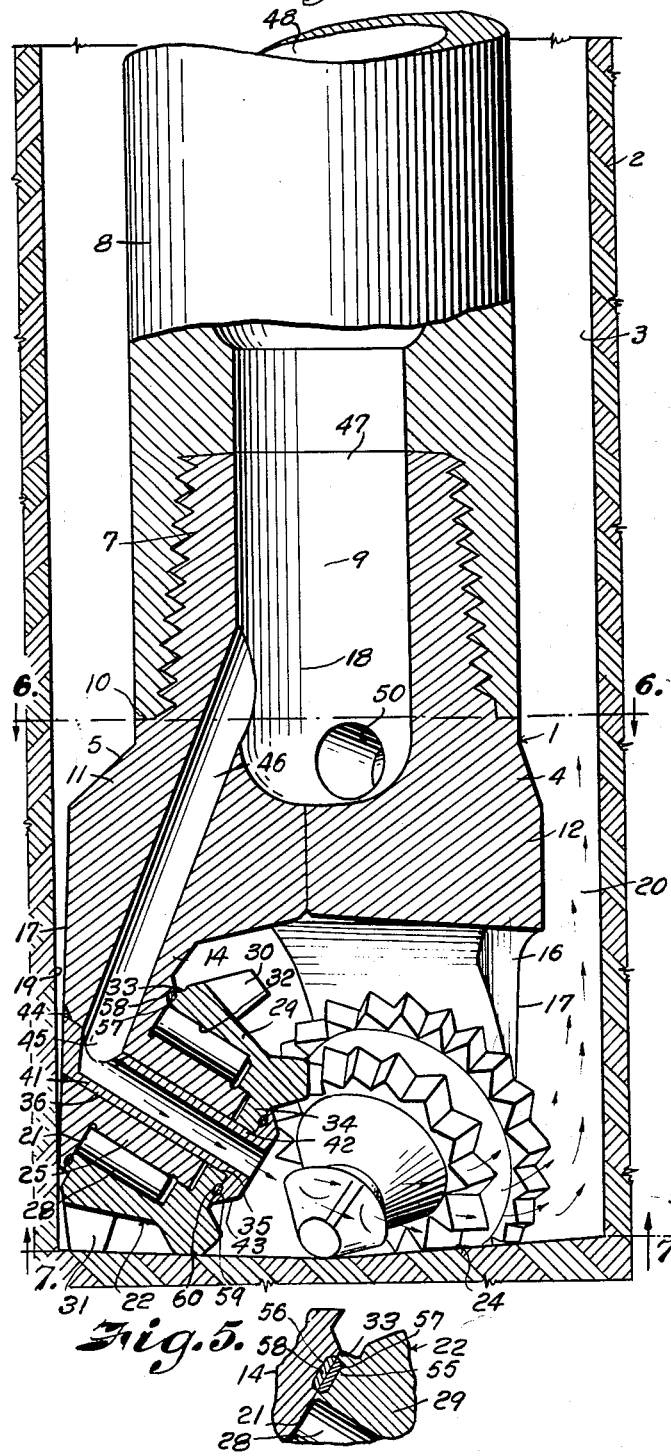
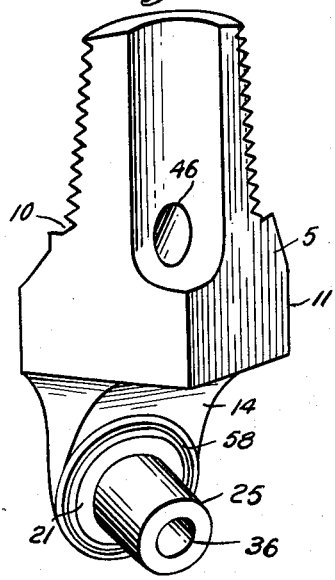
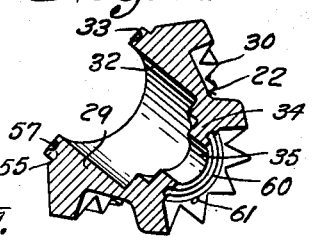
INVENTOR.
Edward B. Williams, Jr.
BY
Paul E. Mullendore
ATTORNEY.

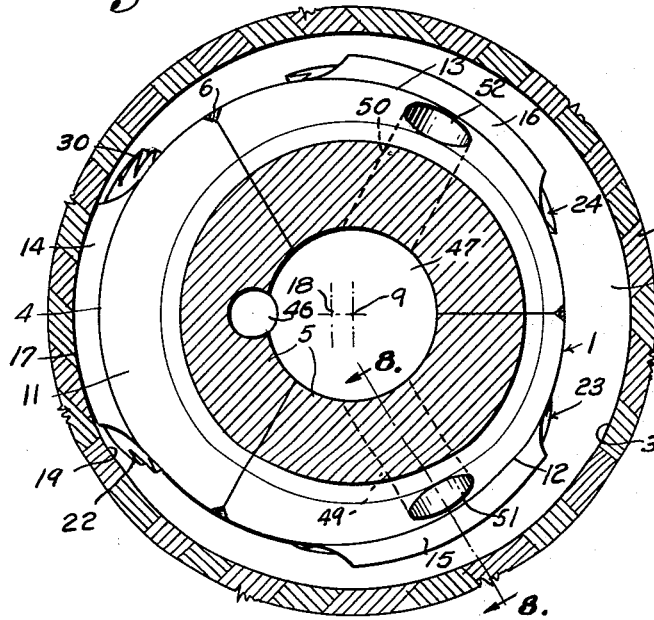
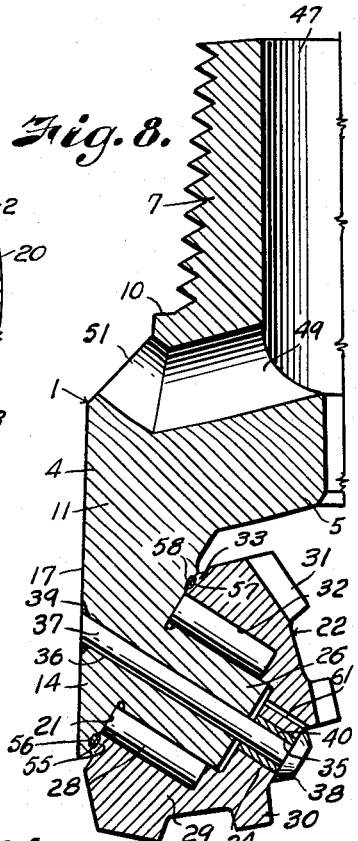
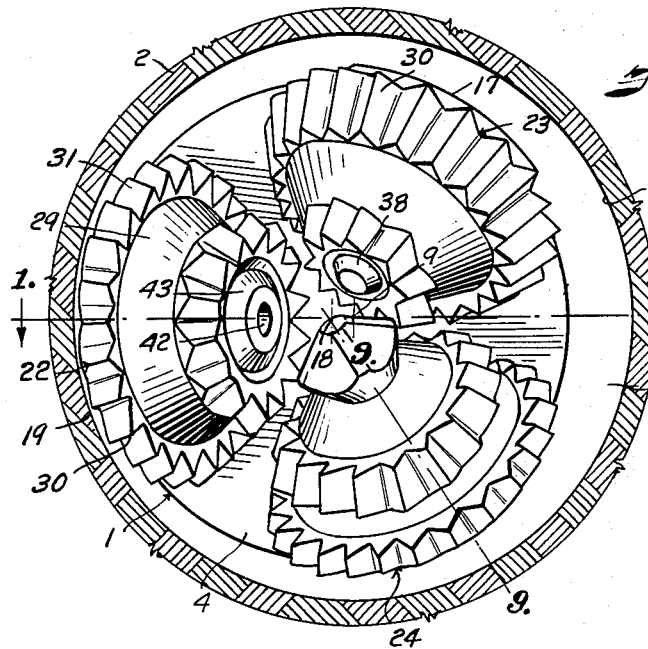
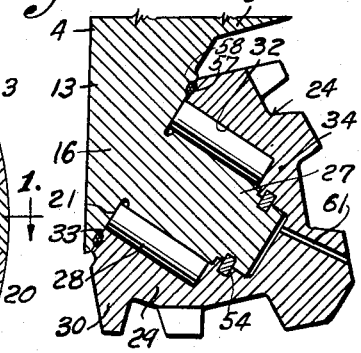

United States Patent Office 3,113,630
Patented Dec. 10, 1963

3,113,630
DRILL BIT
Edward B. Williams, Jr., Greenville, Tex., assignor of one-third to Edward B. Williams III, one-third to Joseph W. Williams, and one-third to David B. Williams
Filed Nov. 8, 1960, Ser. No. 67,957
5 Claims. (Cl. 175—340)

This invention relates to drill bits for rotary drilling of bore holes into earth formations, and particularly to drill bits of the type having toothed cutters for cutting through the various formations encountered in drilling such bore holes.

The cutters of this type of drill bit are usually arranged to roll in paths concentrically with the axis of the body of the drill bit, so that all of the cutters are used to cut the full gauge of the bore hole, consequently one cutter rolls over the same path as a preceding cutter. The result is that the teeth of one cutter must act on the formation through the cuttings produced by the other cutters. Usually the bodies of the drill bits are equipped with ports to discharge one or more jets of drilling fluid in contact with the bottom of the hole, which are supposed to clean the cuttings from under the cutters and carry the cuttings upwardly within the bore hole, however, such jets are not efficient because it is difficult to direct the jets at angles to clean the bottom of the bore hole and have sufficient upflow velocity to carry the cuttings therewith. This is particularly true in "slim" hole drilling because the jets are almost vertical and in opposition to the upward flow. It is obvious that such conditions are not conducive to removal of the cuttings, and the cuttings accumulate in the bottom of the hole, particularly about the juncture of the bottom with the side wall of the bore hole, so that the cutters continue to rotate on the accumulated cuttings and sludge.

Therefore, the principal objects of the present invention are to eliminate these difficulties and to maintain a clean hole by locating the cutters about a common axis that is offset from the axis of rotation so that they gyrate or roll in different paths; and to provide the drill bit with jet means that discharges coaxially through the rotational axis of at least one of the cutters. In this way the cutters roll in circular or gyratory paths about the axis of rotation, but only the cutter furthest from the axis of rotation maintains contact with the wall of the bore hole, leaving the other cutters which are nearer the axis of rotation spaced from the axis of the bore hole, thereby opening a free path for the drilling fluid. The jet is also discharged from the axis of the outermost cutter in a generally radial direction and has gyratory sweeping action in that it progresses around the bottom of the bore hole incidentally to rotation of the bit, to maintain the bottom free from cuttings and prevent accumulation thereof in the bottom and on the wall of the bore hole.

Another difficulty in the smaller sized drill bits is to provide adequate bearings capable of withstanding the tremendous load of the drill stem or the drill pipe by which the bit is rotated. It is, therefore, a further object of the invention to provide a cutter, spindle, and bearing arrangement which has ample strength to withstand the load of the drill pipe, and at the same time accommodate the axial passageway supplying the jet and provide ample radial load and thrust bearings.

A further object of the invention is to provide a bit with rotary cutters may be safely and easily run through a bore hole without damage to the cutters, and which may be run through bore holes and casings of smaller diameter than the size to be cut by the bit, as when continuing the drilling of a larger sized hole to greater depths or when reaming portions of a bore hole.

In accomplishing these and other objects of the invention as hereinafter pointed out, I have provided improved structure, the preferred form of which is illustrated in the accompanying drawings, wherein:

FIG. 1 is a vertical section through the bottom end of a bore hole and showing a drill bit therein which embodies the features of the present invention, the section being taken on the line 1—1 of FIG. 7.

FIG. 2 is a detailed perspective view of one section of the body portion of the drill bit, showing the cutter removed from the spindle portion thereof.

FIG. 3 is a perspective view of the axial jet member through which the jet of drilling fluid is discharged and which retains the cutter on the spindle.

FIG. 4 is a perspective section of a cutter, particularly illustrating the thrust bearing surfaces thereof.

FIG. 5 is an enlarged fragmentary section particularly illustrating the contact of the thrust bearing surfaces.

FIG. 6 is a horizontal section on the line 6—6 of FIG. 1.

FIG. 7 is a cross section through the bore hole and showing the drill bit in end view and the radial sweep of the jet.

FIG. 8 is a partial section through the drill bit taken on the line 8—8 of FIG. 6.

FIG. 9 is a fragmentary section on the line 9—9 of FIG. 7.

Referring more in detail to the drawings:

1 designates a drill bit constructed in accordance with the present invention to drill earth formations 2, as in drilling bore holes 3 from the earth's surface to substantial depths. The drill bit 1 includes a body portion 4, preferably composed of sector shaped sections 5 suitably connected together, as, for example, by welding 6 (FIG. 6). The body of the drill bit includes an externally threaded pin 7 adapted to be connected to a drilling stem 8. The drilling stem is made up of a plurality of interconnected stands of drill pipe as in usual practice, and is rotated by a rotary mechanism (not shown) at the top of the bore hole. The pin 7 is concentric with the rotary axis 9 of the drill stem and forms, with the body 4, an annular shoulder 10.

In the illustrated instance, the body of the bit is composed of three sections designated 11, 12 and 13, and each section is provided with a depending arm 14, 15 and 16, respectively. The depending arms 14, 15 and 16 are grouped in tripoint relation about a common axis 18, to provide the body 4 of the drill bit, somewhat similar to a conventional bit, however, in the present instance the outer faces 17 of the arms are formed transversely thereof on arcs about the common axis 18. The body portion of the drill bit below the shoulder 10 is thus offset radially from the pin 7 that connects with the drill stem 8. When the drill stem 8 is located concentrically with the bore hole 3, the depending arm 14 is relatively close to the wall 19 of the bore hole, but the arcuate faces of the other arms 15 and 16 and the face of the body portion 4 are spaced from the wall 19, to provide an upflow passageway 20 therebetween of generally crescent shaped cross section. The inner or facing sides 21 of the arms are generally flat and diverge outwardly and downwardly to provide backing for the respective cutters 22, 23 and 24. Extending downwardly and inwardly from each of the inner side faces 21 of the arms are integral spindles 25, 26 and 27, having their axes converging at the axis 18. Located on each of the spindles are antifriction bearings, preferably in the form of rollers 28, for journaling the cutters 22, 23 and 24 thereon.

The cutters 22, 23 and 24 have generally conical bodies 29, with the peripheries thereof provided with teeth 30 and which are arranged in spaced apart circular series, with the circular series of teeth on each cutter offset from the circular series of teeth on the other cutters, so that the teeth of the cutters cooperate to act on the entire area of the bottom of the hole when the bit is rotated by the drilling stem. The conical body portions and teeth of the cutters may generally correspond with the body portions and teeth of conventional cutters.

The teeth of the cutters produce different patterns of cuts, so that the cuts produced by a tooth of one cutter are out of registry with the cuts produced by the teeth of the other cutters. The cutter 22 being further from the axis of rotation 9 produces the full diameter of the bore hole 3, while the other cutters 23 and 24 being closer to the axis of rotation 9, are spaced inwardly from the wall, however, all the cutters cooperate to chip or cut away the bottom of the bore hole over which they are caused to revolve. In other words, the cutters 23 and 24 roll in paths about the axis 9, but the base teeth 31 of the cutter 22 being further from the axis 9 roll about the rotational axis 9 in a wider sweep to produce a hole of larger diameter than the overall diameter of the bit, and which will be readily noted by comparing the overall diameter of the bit with the diameter of the bore hole as shown in FIGS. 6 and 7. It is, therefore, obvious that the bit, being of less overall diameter than the diameter of the bore hole, may be readily raised and lowered through the bore hole, without contacting the teeth of the cutters with the wall of the bore hole, by shifting the drill stem laterally to bring the axis 18 into registry with the center line of the bore hole. In this way, a free space is provided within the circumference of the bore hole during rotation of the bit on the axis 9. Also, the bit may be readily removed or lowered through a casing or an upper portion of the bore hole that may be of smaller diameter than the diameter to be drilled by the bit. Since the rotational axes of the cutters 23 and 24 are radial with respect to the axis 18, and since the axis 18 is offset from the rotational axis 9, there is an improved chisel action of the teeth of the cutters 23 and 24 when the bit is in rotation.

The bodies of the outer cutter 22 and the cutter 23 are generally of a more truncated shape than the cutter 24, which latter cutter is of generally conical shape to assure cutting out of the center of the bore hole (see FIGS. 1 and 7). The cutters have concentric recesses 32 extending inwardly from the base faces 33 thereof to accommodate the rollers 28. The recesses have a smaller diametered extension to substantially conform to the diameter of the spindles 25 and 26 at the ends thereof. The smaller ends of the cutters 22 and 23 have inwardly extending flanges 34 which close over the inner ends of the spindles and provide axial openings 35 registering with axial bores 36 of the spindles 25 and 26 that extend through the depending arms.

Extending through the opening 35 of the cutter 23 and entirely through the registering bore 36 of the spindle 26 is a solid shank 37 having a head 38 thereon of larger diameter than the opening 35 to engage the flange 34 of the cutter for holding the cutter on the spindle, as shown in FIG. 8. The shank 37 is fixed in the bore by welding the outer end thereof to the arm 15, as indicated at 39. A bushing 40 is preferably pressed into the opening 35, as shown in FIG. 8, in order to provide a wear resistant bearing.

The opening 35 of the cutter 22 and the bore of the spindle 25 are of larger diameter than the corresponding portions of the cutter 23 to accommodate a tubular shank 41 of larger diameter than the shank 37 and which has an inner diameter of sufficient size to provide a flow passageway 42 for the discharge of drilling fluid in sweeping contact with the bottom of the hole as indicated in FIG. 1. The tubular shank also has a head 43 lapping the end of the cutter, and the end of the shank 41 is welded to the arm 14, as indicated at 44, FIG. 1, for retaining the cutter 22 on its spindle. The tubular shank has ample strength because the spindle on which the cutter rotates carries the load.

The flow passage 42 terminates short of the welded end of the tubular shank and has a port 45 in communication with a channel 46 that connects with an axial bore 47 in the pin 7. The axial bore 47 is in turn connected with the downflow passageway 48 of the drill stem. The downflow passageway is formed angularly through the section of the bit that carries the cutter 22. The sections of the bit that carry the cutters 23 and 24 are provided with passageways 49 and 50 that connect the axial bore 47 with upper and outwardly extending discharge ports 51 and 52, through which streams of drilling fluid are discharged upwardly within the upflow passageway 20 to promote upward flow of drilling fluid and cuttings from the lower portion of the bore hole.

The cutter 24, that is of more conical shape, is mounted on the spindle 27 by roller bearings 28 similarly to the other cutters, however, the spindle 27 is a solid spindle, as shown in FIG. 9, and the cutter is retained thereon by a split ring 54, as indicated in FIG. 9.

The base faces of all of the cutters and the corresponding inner faces of the arms are provided with registering grooves 55 and 56 (FIG. 5) to accommodate wear resistant material, or rings 57 and 58, therein, as best illustrated in FIG. 5, to take the end thrust of the cutters. The under side of the heads and the registering annular portions of the ends of the cutters also have wear resistant material inserts 59 and 60, as shown in FIGS. 1, 3, 4 and 8. The inner ends of the cutters 23 and 24 may also have small ports 61 that are drilled therein as shown in FIGS. 8 and 9.

In assembling the bit at the factory, the roller bearings 28 with the cutters are placed on the spindles of the respective segmental sections 11, 12 and 13. The cutter 24 is secured to its spindle by the split ring 54. The cutters 22 and 23 are secured to their spindles by inserting the shanks 27 and 41 through the openings 35 of the cutters and into the bores of the spindles 25 and 26 until the heads 38 and 42 thereof make contact with the flanges 34 of the cutters. The outer ends of the shanks are then welded to the arms 34 and 15, respectively. After mounting the cutters, the sections 11, 12 and 13 are brought together and welded, as indicated by the numeral 6 so that the axes of the spindles are all radial with respect to the common axis 18.

In using the drill bit constructed and assembled as described, it is attached to the drill stem and the drill stem is lowered into the bore hole, in accordance with the usual practice of running in the drill string. Since the overall diameter of the bit is less than the diameter of the hole, it may be passed through a cased upper portion of the bore hole without damage to the teeth of the bit. The bit may be used for deepening a hole to a larger diameter and successfully lowered to drilling position as long as the hole is no smaller than the overall diameter of the bit.

With the bit in drilling position on the bottom of the hole, a drilling fluid is circulated under pressure downwardly through the drill stem for return flow exteriorly of the drill pipe to the top of the bore hole. Upon starting rotation of the drilling stem, the cutters 22, 23 and 24 will revolve on their spindles 25, 26 and 27 and move in circular paths over the bottom of the hole, with the teeth of the cutters bearing into and chipping away the formation being drilled. The outer cutter 22 moves circularly as it is gyrated about the rotational axis 9 of the drill stem, to maintain the gauge of the bore hole. The teeth of the other cutters 23 and 24 cooperate with the teeth of the cutter 22 to cover the entire bottom of the hole but the radii of the paths covered thereby are obviously less than the path of the cutter 22, so as to maintain the upflow passageway 20. Simultaneously with rotation of the drill stem, a portion of the drilling fluid being circulated passes from the axial bore 47 through the channel 46, port 45, and flow passageway 42 of the tubular shank, to emit a high pressure jet that is directed downwardly and radially incidental to the position of the passageway 42 to impinge against the bottom of the bore hole and sweep between the cutters 23 and 24 to the wall 19 of the bore hole, which diverts the fluid of the high pressure jet upwardly to sweep away the cuttings from the bottom of the hole and carry the cuttings upwardly through the upflow passageway 20 at the side of the bit. During rotation of the bit, the jet maintains its substantially radial discharge and is gyrated about the rotary axis 9 of the drill stem to present the force of the jet in progressive sweeping contact with the entire bottom of the hole upon each revolution of the drill stem. The cuttings made by the teeth of the bit are positively swept from the bottom of the bore hole and upwardly with the diverted jet, to assure a clean bottom and prevent lodging of the cuttings at the juncture of the side wall of the bore hole with the bottom. Simultaneously, jets are discharged through the upwardly directed ports 51 and 52, to maintain the upward flow at high velocity to assure elevation of the cuttings to the top of the bore hole. Thus the teeth of the cutters rotate upon a clean bottom and effect a more rapid and efficient chipping away of the formation.

From the foregoing, it is obvious that the features of offsetting the axis of the bit, the discharge of the drilling fluid through the axis of the outermost cutter, and the relation of the other cutters of the bit thereto, all cooperate to promote the cutting efficiency of the bit and removal of the cuttings.

It is also obvious that the mounting of the cutters on the spindles of the bit provide adequate bearing for supporting the load of the drill pipe, and the wear resistant inserts are effective in taking the end thrust of the cutters. It is also obvious that the provision of the axial flow passageway through one of the cutters to provide a sweeping jet does not sacrifice the strength of the parts required to adequately journal the rotary cutter from which the jet is discharged.

What I claim and desire to secure by Letters Patent is:

1. A rotary drill bit for drilling earth formations and the like, including
    a body member having a central axis and provided with depending arms grouped in tripoint relation about the central axis,
    a spindle carried on each arm and extending downwardly and inwardly therefrom toward the central axis of the body member,
    a cutter rotatable on each spindle,
    a drill stem connection having an axis of rotation offset radially from the central axis of the body member on the diametrical side thereof opposite the terminal end of one of the spindles whereby the cutter that is mounted on that spindle rolls on the bottom of a bore hole in a circular path about the axis of rotation of the drill stem connection to maintain gauge of the bore hole and the other cutters gyrate about the axis of rotation in paths of shorter radii than the path of the cutter that maintains the gauge of the bore hole to leave space between the wall of the bore hole and the said other cutters to provide an unobstructed upflow passageway directly opposite the cutter that maintains gauge of the bore hole, and
    means for discharging a drilling fluid from the drill stem connection and through the said one spindle in a high pressure jet across the rotational axis of the bit to sweep cuttings from the center of the bore hole outwardly between the said other cutters and upwardly of said upflow passageway.

2. A rotary drill bit for drilling earth formations and the like as described in claim 1, and including
    a shank extending longitudinally within said one spindle and having a head engaging the inner end of the cutter to retain the cutter on said spindle, and in which the drilling fluid discharge means comprises a channel extending downwardly through the arm that carries said one spindle and the shank has a bore in connection with said channel and has an outlet opening through the head of said shank.

3. A rotary drill bit for drilling earth formations and the like, including
    a body member having a central axis and provided with depending arms grouped in tripoint relation about the central axis,
    a spindle carried on each arm and extending downwardly and inwardly therefrom toward the central axis of the body member,
    a cutter rotatable on each spindle,
    a drill stem connection having an axis of rotation offset radially from the central axis of the body member on the diametrical side thereof opposite the terminal end of one of the spindles whereby the cutter that is mounted on that spindle rolls on the bottom of a bore hole in a circular path about the axis of rotation of the drill stem connection to maintain gauge of the bore hole and the other cutters gyrate about the axis of rotation in paths of shorter radii than the path of the cutter that maintains the gauge of the bore hole to leave space between the wall of the bore hole and the said other cutters to provide an unobstructed upflow passageway of generally crescent cross sectional shape directly opposite the cutter that maintains gauge of the bore hole, and
    means for discharging a drilling fluid from the drill stem connection and through the said one spindle in a high pressure jet and across the rotational axis of the bit to sweep cuttings from the center of the bore hole outwardly between the said other cutters and upwardly of said upflow passageway.

4. A rotary drill bit for drilling earth formations and the like as described in claim 3,
    in which the body member has passageways from the drill stem connection having upwardly directed outlets at respective sides of the crescent shaped upflow passageway for inducing upward flow of the cuttings carried by the high velocity jet.

5. A rotary drill bit for drilling earth formations and the like, including
    a body member having a central axis and provided with depending arms grouped in tripoint relation about the central axis,
    a spindle carried on each arm and extending downwardly and inwardly therefrom toward the central axis of the body member.
    a cutter of generally conical shape rotatable on a first of the spindles to cut away the center of a bore hole,
    cutters of more generally truncated shape rotatable upon the second and third spindles,
    a drill stem connection having an axis of rotation offset radially from the central axis of the body member on the diametrical side thereof opposite the terminal end of the second of the spindles whereby the cutter that is mounted thereon rolls on the bottom of a bore hole in a circular path about the axis of rotation of the drill stem connection to maintain gauge of the bore hole and the other two cutters gyrate about the axis of rotation in paths of shorter radii than the path of the cutter that maintains the gauge of the bore hole to leave space between the wall of the bore hole and the said other two cutters to provide an unobstructed upflow passageway directly opposite the cutter that maintains gauge of the bore hole, and
    means for discharging a drilling fluid from the drill stem connection and through the said second spindle in a high velocity jet across the rotational axis of the bit to sweep cuttings from the center of the bore hole outwardly between the said other cutters and upwardly of said upflow passageway.

References Cited in the file of this patent

UNITED STATES PATENTS

| | | |
|---|---|---|
| 1,949,049 | Hopkins | Feb. 27, 1934 |
| 2,098,758 | Reed | Nov. 9, 1937 |
| 2,184,067 | Zublin | Dec. 19, 1939 |
| 2,200,482 | Winslow | May 14, 1940 |
| 2,634,101 | Sloan | Apr. 7, 1953 |
| 2,805,043 | Williams | Sept. 3, 1957 |